(12) United States Patent
Tapper et al.

(10) Patent No.: US 7,288,130 B2
(45) Date of Patent: Oct. 30, 2007

(54) CASSETTE FILTER

(75) Inventors: Renate Tapper, Bensheim (DE);
Thomas Schroth, Bobenheim (DE);
Thomas Caesar, Leimen (DE)

(73) Assignee: Carl Freudenberg KG, Weinheim (DE)

( * ) Notice: Subject to any disclaimer, the term of this patent is extended or adjusted under 35 U.S.C. 154(b) by 388 days.

(21) Appl. No.: 10/508,814

(22) PCT Filed: Sep. 26, 2002

(86) PCT No.: PCT/EP02/10782

§ 371 (c)(1),
(2), (4) Date: Sep. 22, 2004

(87) PCT Pub. No.: WO03/080222

PCT Pub. Date: Oct. 2, 2003

(65) Prior Publication Data

US 2005/0160915 A1    Jul. 28, 2005

(30) Foreign Application Priority Data

Mar. 22, 2002   (DE)   ................. 102 13 047

(51) Int. Cl.
*B01D 46/00*   (2006.01)
(52) U.S. Cl. ............ 55/501; 55/464; 55/499; 55/500; 55/521; 96/384; 96/385
(58) Field of Classification Search .......... 96/384, 96/385, 134, 135, 139; 55/391, 462, 464, 55/465, 442, 443, 497, 499, 500, 501, 502, 55/521, 494, 418, 419, 486–489, 482
See application file for complete search history.

(56) References Cited

U.S. PATENT DOCUMENTS

| | | | | |
|---|---|---|---|---|
| 5,288,298 A | * | 2/1994 | Aston | 96/135 |
| 5,792,228 A | | 8/1998 | Fath et al. | 55/497 |
| 6,299,660 B1 | * | 10/2001 | Pfeuffer et al. | 55/294 |
| 6,352,579 B1 | * | 3/2002 | Hirata et al. | 96/134 |
| 2003/0037521 A1 | * | 2/2003 | Chicks et al. | 55/497 |
| 2003/0145568 A1 | * | 8/2003 | Hodge | 55/418 |
| 2003/0177909 A1 | * | 9/2003 | Koslow | 96/154 |

FOREIGN PATENT DOCUMENTS

| | | |
|---|---|---|
| DE | 4243932 | 7/1994 |
| DE | 4412034 | 10/1995 |

(Continued)

*Primary Examiner*—Duane Smith
*Assistant Examiner*—Robert A Clemente
(74) *Attorney, Agent, or Firm*—Davidson, Davidson & Kappel, LLC

(57) ABSTRACT

A cassette filter comprising a frame and a pleated filter material that is inserted therein, in addition to a protective grid having passage holes. The protective grid is fastened at a distance from the filter material in the frame and has a flow resistance that is smaller than that of the pleated filter material. The protective grid includes at least one film strip that is bent around the passage holes, said film strip extending parallel relative to the direction of flow of the medium to be filtered, and in that the protective grid recurrently contacts at least one other identically bent film strip outside the passage holes in contact points and is glued to said other film strip in the contact points.

16 Claims, 1 Drawing Sheet

FOREIGN PATENT DOCUMENTS

| | | |
|---|---|---|
| DE | 19545046 | 6/1997 |
| DE | 19545064 | 6/1997 |
| DE | 19601978 | 7/1997 |
| DE | 19734081 | 2/1999 |
| JP | 6146733 | 5/1994 |
| WO | 9619279 | 6/1996 |
| WO | WO 9619279 A1 * | 6/1996 |

* cited by examiner

CASSETTE FILTER

The present invention relates to a cassette filter which has a frame and a pleated filter material that is inserted therein as well as a protective grid having passage holes, the protective grid being fastened in the frame at a distance from the filter material and having a flow resistance which is lower than that of the pleated filter material.

BACKGROUND

German Patent Document No. DE 195 45 064 A1 describes a cassette filter which is used as a particulate filter and as a microfilter. Cassette filters of this type have proven successful in practice. Pleated filter mats such as those disclosed in German Patent Document No. DE 195 45 046 C2 are used as the filter medium.

The filter media used with cassette filters are of various designs and material compositions. For example, glass fiber paper is used for filters of higher filter classes, but it has a very low resistance to mechanical stresses. It tears easily, in particular when handled improperly, which results in damage to the filter medium, and thus to an impairment and possibly even to loss of the filter properties. For this reason, in a number of applications, the filters are provided with a protective grid in front of and/or behind the filter package to protect the filter medium from contact and/or damage. The protective grid is glued to and/or embedded in the filter package in a frame. The protective grid, which is also referred to as a grip guard, must have a high air permeability combined with a high rigidity at the same time. The material to be used must be selected accordingly. Since the filters are sometimes very limited in their overall height, the material must not be too thick. In addition, the grip guard should have a planar design. To meet this condition, protective grids are currently being made of expanded metal, stainless steel, or aluminum. However, this material substantially increases the weight of the filter. In addition, the material is not incinerable, i.e., it cannot be reduced to ashes. One possibility for making it incinerable might be to use protective grids made of plastic instead of metal. However, experiments have shown that the rigidity of such grids is not sufficient to reliably prevent damage to the filter medium.

SUMMARY OF THE INVENTION

An object of the present invention is to create a possibility with which the filter medium, i.e., the filter material, is protected from damage with the greatest of certainty. In addition, the product should be simple in design and assembly, should have a low weight, and should be inexpensive to manufacture.

The present invention provides a cassette filter having a protective grid composed of at least one film strip that is bent around the passage holes and extends parallel to the direction of oncoming flow of the medium to be filtered; the film strip repeatedly touches at least one other identically bent film strip outside of the passage holes at contact points and is glued to it at the contact points. A honeycomb-like structure is produced from the films, forming a protective grid of extremely high stability and strength.

The film strips may have the shape of a film ring of a triangular, quadrangular, hexagonal, or round layout. However, it is also possible to manufacture a honeycomb structure in which the film strips, which are provided with corrugations and/or bends running back and forth, are joined together.

Film strips having a thickness of a maximum of 0.5 mm are used. It is also advantageous to design the protective grid in such a way that its open area amounts to more than 75% of the oncoming flow area with a maximum diameter of the passage holes of 15 mm. The diameter of the passage holes is selected to be between 2 mm and 15 mm. The passage holes of one honeycomb usually have the same diameter.

To minimize the weight of the cassette filter, a thickness, i.e., core height, of 1 mm to 10 mm is selected for the protective grid. The honeycomb structure of the protective grid already yields high rigidity and strength with extremely small thicknesses.

One simple possibility of forming a protective grid is for the film strip to be made of a supporting layer having a higher melting point and an adhesive layer which borders the supporting layer and is thermally softenable at least once at a comparatively lower temperature and the film strips are glued together by temporary softening and pressing in the area of the adhesive layer forming the protective grid. Plastic or paper is primarily used as the material for the supporting layer. However, metal may also be used.

A pleated filter mat is preferably used as the filter material having partings that are glued to spacers. These spacers are formed by strips which are arranged longitudinally to the direction of the partings with a spacing between them and may themselves serve simultaneously as a support for the protective grid. It is advantageous here to use strips of foamed or unfoamed plastic.

The filter mat itself is preferably made of a nonwoven material. However, it is also possible to use a filter mat made of paper, if necessary in combination with a nonwoven material. In higher filter classes, it is advantageous if the nonwoven material contains glass fibers and/or synthetic fibers, synthetic threads and/or a binder.

Due to its design as a honeycomb grid, the protective grid may also be used as a flow straightener or sound absorber for the medium to be cleaned.

BRIEF DESCRIPTION OF THE DRAWING

On the basis of an exemplary embodiment, the present invention is explained in greater detail below with reference to the drawing, in which.

DETAILED DESCRIPTION

Figure 1:
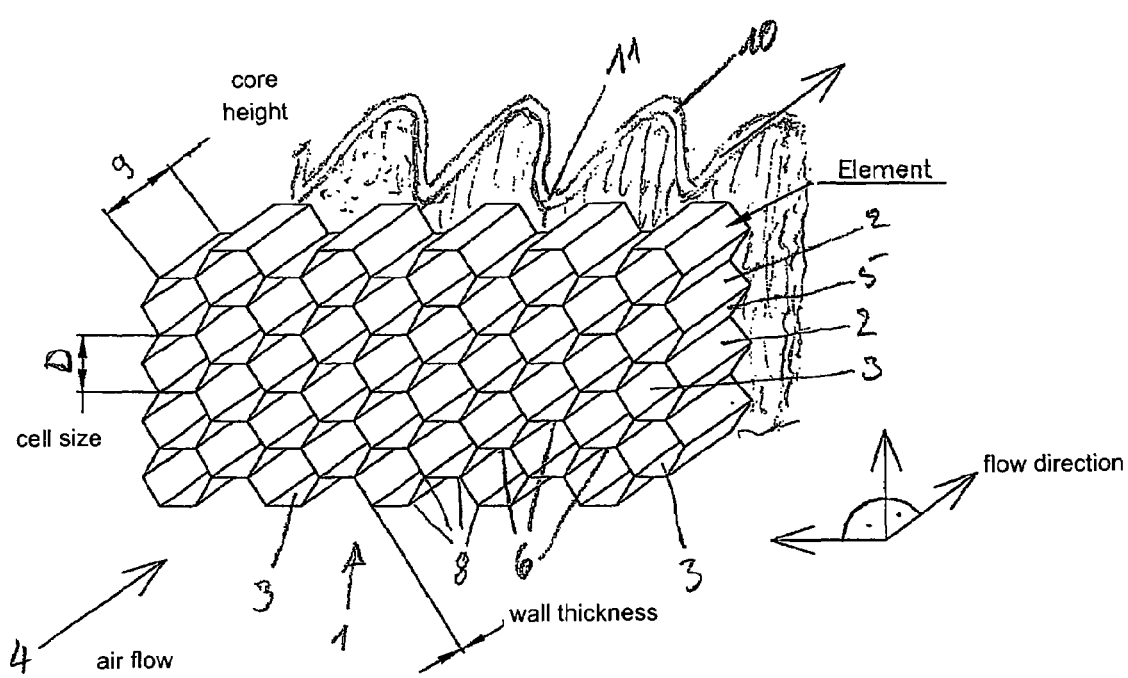
FIG. 1 shows on an enlarged scale a perspective view of a detail of a protective grid according to the present invention.

In conjunction with the general design of a cassette filter having a frame and a pleated filter mat and protective grid inserted into it, reference is made to DE 195 45 064 A1. In FIG. 1, protective grid 1 according to the present invention is manufactured from individual film strips 2 and 5, which between them form passage holes 3. Film strips 2 and 5 run parallel to oncoming flow direction 4 of the medium to be filtered. A film strip 5 of an identical design is attached to film strip 2. Points of contact 6 are formed by correspondingly stacking film strips 2 and 5 on top of each other. At these points of contact 6, film strips 2 and 5 are glued together. In the selected example, this results in passage holes 3 having a hexagonal layout with a cell size D. Such a design of the honeycomb is formed by film strips, which are provided with corresponding bends 8. However, it is also possible to bond film strips together in a corrugated form. Due to the selected thickness of film strips 2 and 5, which is less than 0.5 mm, and the selected diameter of passage holes 3, an open area amounting to more than 75% of the oncoming flow area is achieved. Core height 9 of protective grid 1 is selected to be 8 mm.

Filter mat 10 with partings 11 is situated downstream from protective grid 1, as seen in the direction of flow. Spacers (not shown in detail here) in the form of strips may be placed over these partings 11, simultaneously supporting protective grid 1. Filter mat 10 is made of a nonwoven material having embedded glass fibers.

What is claimed is:

1. A cassette filter for filtering a medium, comprising:
   a frame;
   a pleated filter material disposed in the frame and having a first flow resistance; and
   a protective grid having passage holes disposed in the frame at a distance from the filter material and having a second flow resistance lower than the first flow resistance, the protective grid including:
   a first film strip extending parallel to a flow direction of the medium and bent around the passage holes and including a plurality of contact points; and
   a second film strip bent identically as the first film strip and recurrently contacting the first film strip at the plurality of contact points and being glued to the first film strip outside of the passage holes.

2. The cassette filter as recited in claim 1, wherein the first and second film strips form a film ring having a shape, wherein the shape includes at least one of a triangle, a quadrangle, a hexagon, and a circle.

3. The cassette filter as recited in claim 1, wherein the first and second film strip includes at least one of reciprocating corrugations and reciprocating bends.

4. The cassette filter as recited in claim 1, wherein at least one of the first and second film strips have a maxinium thickness of 0.5 mm.

5. The cassette filter as recited in claim 1, wherein the protective grid has an open area amounting to more than 75% of a flow area of the protective grid.

6. The cassette filter as recited in claim 1, wherein the passage holes have a diameter of less than or equal to 15 mm.

7. The cassette filter as recited in claim 6, wherein the diameter is from 2 mm to 15 mm.

8. The cassette filter as recited in claim 1, wherein the protective grid has a core height in the flow direction of 1 mm to 10 mm.

9. The cassette filter as recited in claim 1, wherein each of the first and second film strips include a supporting layer and an adhesive layer bordering the supporting layer, wherein the supporting layer has a higher melting point than the adhesive layer, wherein the adhesive layer is thermally softenable at least once at a lower temperature than the supporting layer, and wherein the first and second film strips are glued together using the adhesive layer.

10. The cassette filter as recited in claim 9, wherein the supporting layer includes at least one of metal, rilastic, and paper.

11. The casseltte filter as recited in claim 1, wherein the pleated filter material includes a plurality of partings and further comprising spacer strips supporting the protective grid and glued to the partings.

12. The cassette filter as recited in claim 11, wherein the spacer strips include one of foamed plastic and unfoamed plastic.

13. The cassette filter as recited in claim 1, wherein the filter material includes one of paper and a nonwoven material.

14. The cassette filter as recited in claim 1, wherein the filter material includes a nonwoven material containing a binder and one of glass fibers, synthetic fibers and synthetic threads.

15. The cassette filter as recited in claim 1, wherein the protective grid is configured to straighten a flow of the medium.

16. The cassette filter as recited in claim 1, wherein the protective grid is configured as a sound absorber for the medium.

* * * * *